US007523719B2

(12) United States Patent
Miller et al.

(10) Patent No.: US 7,523,719 B2
(45) Date of Patent: Apr. 28, 2009

(54) PET SAFETY ENCLOSURE METHOD AND APPARATUS

(75) Inventors: Catherine L. Miller, Bellingham, WA (US); Karen Reed, Bellingham, WA (US)

(73) Assignee: Wild Whiskers LLC, Bellingham, WA (US)

( * ) Notice: Subject to any disclaimer, the term of this patent is extended or adjusted under 35 U.S.C. 154(b) by 0 days.

(21) Appl. No.: 11/206,011

(22) Filed: Aug. 16, 2005

(65) Prior Publication Data
US 2006/0037553 A1 Feb. 23, 2006

Related U.S. Application Data

(60) Provisional application No. 60/601,901, filed on Aug. 16, 2004.

(51) Int. Cl.
*A01K 1/035* (2006.01)
(52) U.S. Cl. ...................................................... 119/496
(58) Field of Classification Search ............... 119/498, 119/28.5, 452, 496, 484, 459, 461, 500; 135/125, 135/126, 128; D30/108
See application file for complete search history.

(56) References Cited
U.S. PATENT DOCUMENTS

| | | | | | |
|---|---|---|---|---|---|
| 3,960,161 | A | * | 6/1976 | Norman | 135/126 |
| 3,990,463 | A | * | 11/1976 | Norman | 135/126 |
| 4,819,389 | A | * | 4/1989 | Kihn | 52/2.21 |
| 5,072,694 | A | * | 12/1991 | Haynes et al. | 119/482 |
| 5,078,096 | A | * | 1/1992 | Bishop et al. | 119/497 |
| 5,137,044 | A | * | 8/1992 | Brady | 135/126 |

(Continued)

OTHER PUBLICATIONS

Protect Young Plants from Hungry Rabbits By Stephen Vantassel, UNL Wildlife Project Coordinator http://209.85.173.104/search?q=cache:qlSPEU9VdTIJ:acreage.unl.edu/Newsletter/NLS.

(Continued)

*Primary Examiner*—Yvonne R. Abbott
(74) *Attorney, Agent, or Firm*—Jellett Law Group PS

(57) ABSTRACT

A portable self erecting pet enclosure which provides protection to domesticated animals when the animals are introduced into hostile or new environments. The pet enclosure design has a support system and a nylon webbing cover. The support system is constructed of two concentric flat spring wire loops each having substantially the same diameter. The support system has a foundational bottom loop and a supporting frame loop. The foundational bottom loop defines the outer perimeter of the floor and the supporting frame loop is arranged in a saddleback configuration to support the roof. The supports are contained within support sleeves which are sewn onto the nylon webbing. The pet enclosure apparatus has a small insertion port and a large extraction port. The small insertion port is for easily inserting the animal into the enclosure. The large extraction port is designed so that the pet owner can easily remove the animal. The nylon webbing has a weave spacing which is narrow enough to prevent the animal's paws or jaws from extending out of the pet enclosure, but provides enough space for the cat to pull on the webbing which acts as a modified scratching post. The webbing is strong enough to resist tearing and or ripping of the fibers. The portable self-erecting pet enclosures can be arranged in groups and connected to one another or to a pet door of an existing house through the use of a conduit constructed of the same material.

12 Claims, 10 Drawing Sheets

U.S. PATENT DOCUMENTS

| | | | | |
|---|---|---|---|---|
| 5,163,461 | A * | 11/1992 | Ivanovich et al. | 135/126 |
| 5,337,772 | A * | 8/1994 | Habchi | 135/125 |
| 5,561,876 | A * | 10/1996 | Petruzella | 5/724 |
| 5,645,096 | A * | 7/1997 | Hazinski et al. | 135/126 |
| 5,664,596 | A * | 9/1997 | Zheng | 135/126 |
| 5,676,168 | A * | 10/1997 | Price | 135/126 |
| 5,722,446 | A * | 3/1998 | Zheng | 135/125 |
| 6,098,349 | A * | 8/2000 | Zheng | 52/126.1 |
| 6,257,263 | B1 * | 7/2001 | Brereton | 135/126 |
| 6,289,910 | B1 * | 9/2001 | Zheng | 135/125 |
| 6,360,760 | B1 * | 3/2002 | Louie et al. | 135/123 |
| 6,363,955 | B1 * | 4/2002 | Louie | 135/126 |
| 6,604,537 | B2 * | 8/2003 | Zheng | 135/126 |
| 6,668,847 | B2 * | 12/2003 | Zheng | 135/125 |
| 6,672,323 | B2 * | 1/2004 | Gupta et al. | 135/126 |
| 6,688,256 | B1 * | 2/2004 | King | 119/474 |
| 6,702,374 | B2 * | 3/2004 | Kams | 297/184.13 |
| 6,705,338 | B2 * | 3/2004 | Zheng | 135/126 |
| 6,715,446 | B2 * | 4/2004 | Chou | 119/497 |
| D501,063 | S * | 1/2005 | Bertoli et al. | D30/108 |
| 6,848,460 | B2 * | 2/2005 | Zheng | 135/126 |
| 6,851,136 | B2 * | 2/2005 | Brereton | 5/102 |
| 6,899,057 | B1 * | 5/2005 | Chrisco et al. | 119/498 |
| 6,901,940 | B2 * | 6/2005 | Zheng | 135/126 |
| D514,747 | S * | 2/2006 | Bertoli et al. | D30/108 |
| D518,243 | S * | 3/2006 | Weidner | D30/108 |
| D519,280 | S * | 4/2006 | Kellogg et al. | D3/305 |
| 7,044,083 | B2 * | 5/2006 | Farmer et al. | 119/474 |
| D524,995 | S * | 7/2006 | Dudas | D30/109 |
| 2004/0194723 | A1 * | 10/2004 | Farmer et al. | 119/474 |
| 2006/0037553 | A1 * | 2/2006 | Miller et al. | 119/497 |

OTHER PUBLICATIONS

Camping Tent Materials By, MaxLifestyle International Inc. http://www.abc-of-hiking.com/hiking-tents/tent-materials.asp.
Mosquito Netting By Vermont's Barre Army Navy http://209.85.173.104/search?q=cache:XsQikVOJauUJ:www.vtarmynavy.com/mosquito_n... Apr. 29, 2008.
Declaration of Chris Barker, PE Under 37 CRF 1.132.

* cited by examiner

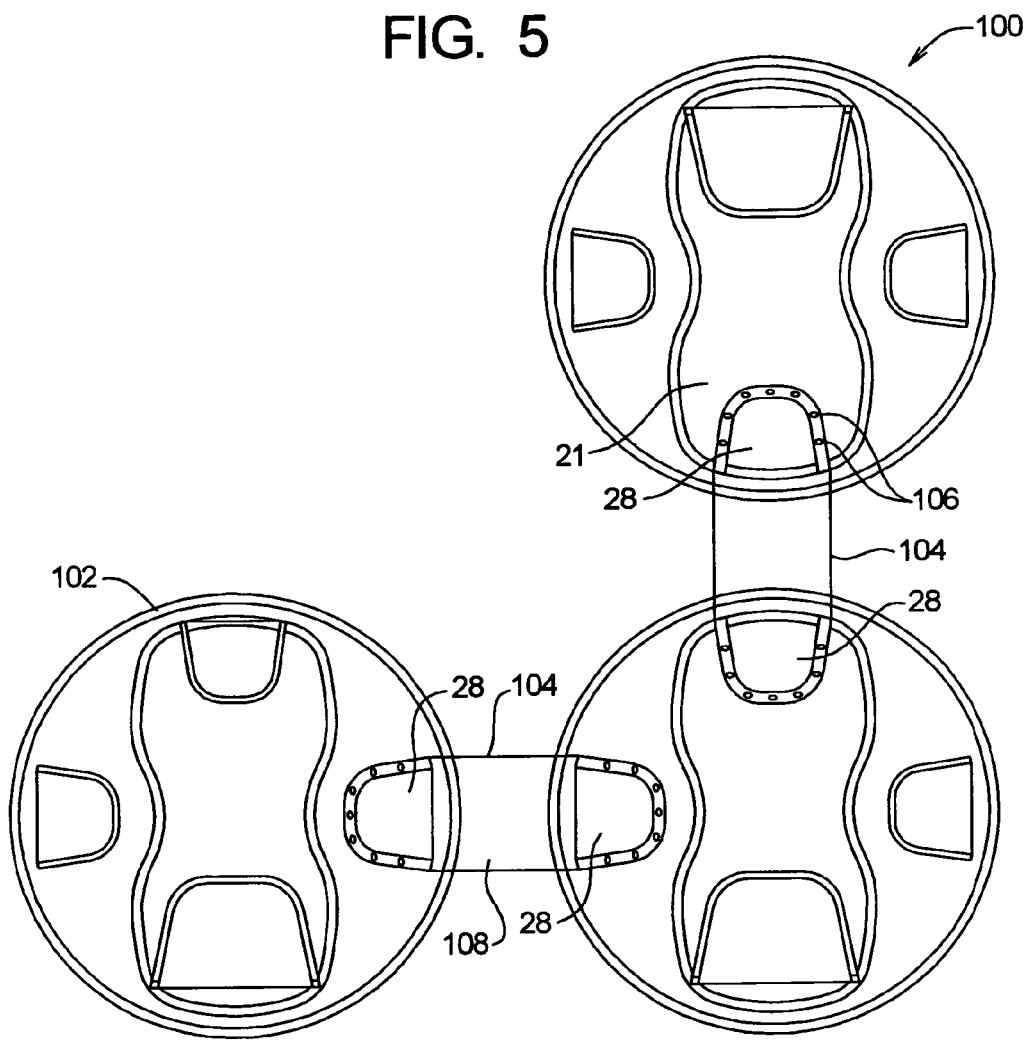

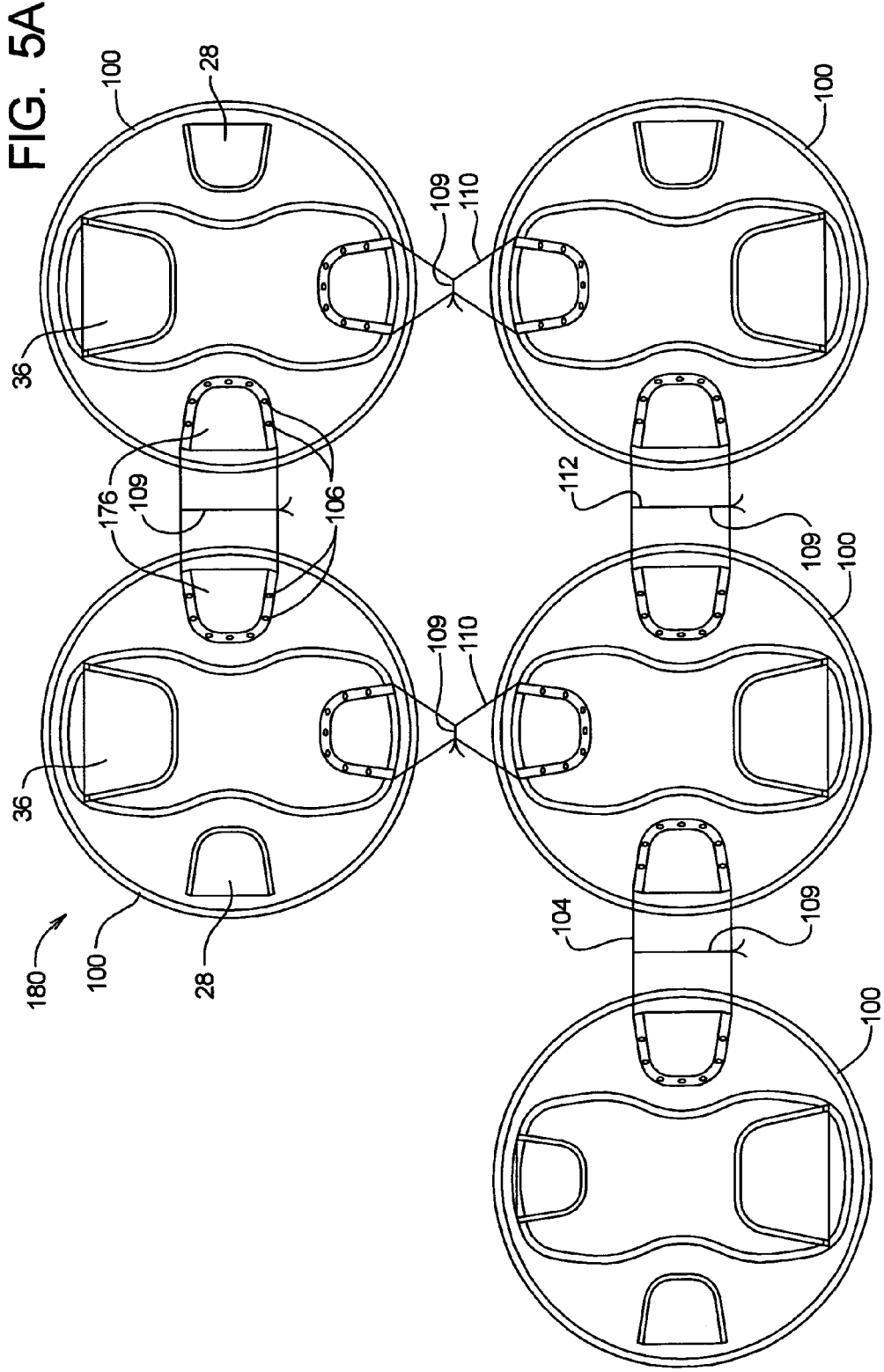

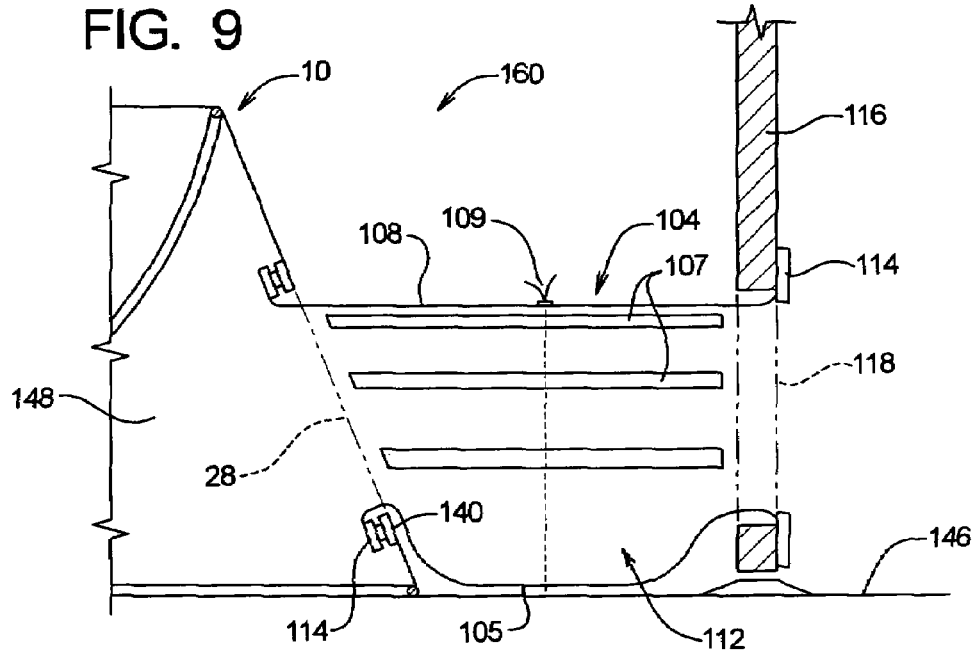
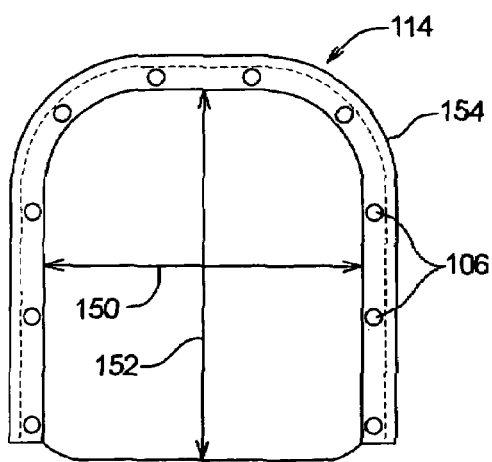
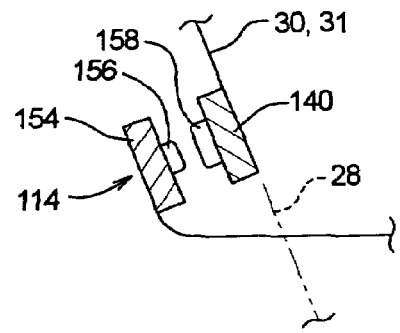

PET SAFETY ENCLOSURE METHOD AND APPARATUS

RELATED APPLICATIONS

This application claims priority benefit of U.S. Ser. No. 60/601,901, filed Aug. 16, 2004

BACKGROUND OF THE DISCLOSURE a) Field of the Invention

The domestication of animals has occurred throughout human history, but most recently the pet owners themselves have taken the domestication of animals to new levels. With the domestication of the animal comes the required responsibility for keeping the animal safe from hostile environments. Further, because animals do not have the intellectual sophistication of humans, the animals when introduced into a new environment may become agitated, hostile or unpredictable. The general idea of this concept is to provide a portable pet enclosure which allows the domesticated animal owner to take the pet into unfamiliar or hostile environments and to keep the animal relatively safe.

Situations may arise such as when the domesticated animal is first introduced into a household and where other animals may be living within the household. Such a situation may create territorial tension between the existing animals and the new animal. Thus many times the pet owner will sequester the new animal from the current pets until such time as the animals become used to one another. The owner may use a gate or other structure to separate the animals from each other. Instead of using a gate or actually separating the animals in different rooms, an enclosure such as the one described below will allow the animals to interact and still keep them from being aggressive towards one another. After a period of time the animals will become comfortable with each other and can be co-mingled.

Travel situations might arise such as when the pet owner wishes to have the company of the domesticated animal with them as they go into the backyard or to a park or other outdoor activity. In such a situation, it is beneficial to keep the animal from running away, especially when uncontrollable factors such as birds, mice, insects and other entertaining distractions would take the animal away from the pet owner's immediate control or vicinity. To keep the animal near, a pet enclosure such as the one described below, which allows for the animal to experience the outdoors but still be contained relatively safely within a controlled environment, can be beneficial to the health, safety or welfare of the animal.

Further, by providing a less harsh environment, meaning an enclosure which is permeable by air, sound, and which does not have any hard surfaces to speak of, the animal will be less on edge and have a more even temper. This is beneficial when using the pet enclosure as described below in situations such as animal shelters or humane societies where the pets are on display for potential adoption. When the animals are at a more even temperament, potential adoptive owners are more likely to commit to adoption.

Still further, many times activities of the domesticated animals include competitions between animal type such as cats between cats and dogs between dogs of different breeds or the same breed within a competitive environment such as a stadium or convention hall or center of some sort. During the competition, animals and their owners will be in the staging area and have restricted movement or preparation space, and be surrounded by other animals which can act as a distraction. The pet owner may have the animal held in one arm while needing to erect a temporary pet enclosure to keep the animal contained so as to avoid fights between other competitors. Thus, the pet enclosure as described below, which has simple self-erecting capabilities and simple collapsible capabilities, is desirable for use in the above-mentioned situations.

Still further, a domesticated animal sometimes needs to give birth and wean the litter in the home environment. Having a pet enclosure which is easily erectable and can contain a mother and its litter for weaning of the small puppies or kittens in a relatively safe and controlled environment can be further very beneficial. By using such a pet enclosure, the small puppies or kittens are less likely to wander off into undesirable locations which may be hard to reach and extract them from, for example behind a refrigerator or within a small pipe or the like.

Because of these and other safety and/or transportation purposes, the below-mentioned domesticated animal self-extracting and self-erecting pet enclosure is provided. The following prior art discusses pet tents, pet carriers, and human tents and the like.

b) Background Art

The Prior Art falls into the following subcategories including:

Pet Tent Enclosures

U.S. Pat. No. 1,887,108 (Steese) discloses an animal shelter which has a rigid floorboard made of wood or other suitable material and a cover of wool, flannel or other fabric. The cover acts as a closure piece at the rear end of the animal shelter where it is stitched to the floorboard. Two stays support the forward end of the cover to form the hood. A pillow or cushion can be placed on the floorboard to provide a bed for the animal.

U.S. Pat. No. 4,576,116 (Binkert) discloses a collapsible house for cats using an A-frame type structure which has a roof constructed of carpet-like material. The roof panels have their bottom edges connected to opposite edges of the floor panel, also covered with the carpet-like material. Stiffening panels are fixed to the backside of the roof panels. The cat can be amused by objects connected to the apex of the A-frame. A cord attached to the top of the A-frame allows for a manual handle to lift the cat house.

U.S. Pat. No. 5,000,116 (Fife) discloses a self-covering pet bed having a dual purpose of sleeping apparatus on the top wall of the pet bed, or allowing the animal to climb inside and be covered. The apparatus has a top wall, ribbed sides, and a base. The top wall can be compressed downwards to the bottom wall and compressing the side walls inward, thus collapsing the pet bed.

U.S. Pat. No. 5,335,618 (Zarola) discloses a collapsible animal enclosure using support bows which extend transversely across the sidewalls and roof for holding the pliable material which forms the enclosed area. The house unit can be collapsed between a fully erected condition and a collapsed condition where the ends are pushed inward towards one another collapsing the pliable material between the ends in an accordion like manner.

U.S. Pat. No. 6,688,256 (King) discloses an animal enclosure which is portable and has a number of frame pieces which are connected by flexible netting. The frame pieces have a semicircular hoop shape with two end prongs for insertion into the ground. Cross bars extend between the legs of the frame pieces to create a base for the ground. Doors are attached at the ends of the frame pieces and secured to open and close through the use of a zipper.

U.S. Pat. No. 6,715,446 (Chou) discloses a pet tent which includes a collapsible tent for housing a pet and which folds into a storage bag when not in use. The tent has a main body, front and back panels, a frame which is configured in an upside down U dome-shape, mesh windows on the sides of the main body, shades provided on the outside of the windows, and opening on the front panel that allows ingress and egress.

U.S. Pat. No. 6,851,136 (Brereton) discloses an erectable and collapsible portable structure where the structure is a pop-up type of structure, forming a receptacle and enclosure, where the receptacle and enclosure can be folded into a plurality of overlying loops and configured into a storage position. The structure can form a portable cot or animal bed which may be quickly released and erected using the pop-up principle and then readily folded and stored when not required. Referring to column 2 at line 21, the structure has a first part and a second part. The first part is made of 2 superimposed coil frames contained within a fabric sleeve and which are sewn to opposite edges of a cylindrical wall. The second part is a flexible coilable frame contained within the fabric sleeve which assumes the shape of a figure eight and defines first and second loops which cross at the apex of the structure and extend downwards towards the first part.

A second Prior Art sector includes:
Pet Carriers

U.S. Pat. No. 5,078,096 (Bishop) discloses a collapsible container for housing and carrying pets where the container is somewhat curvilinear and includes a four-sided pyramidial container for housing and carrying a small household pet. The container has a flexible fabric cover defining optionally coverable mesh windows and access door structures. The container has a rigid bottom insert and is supported by a rod frame having a square releasably interconnected bottom element formed of four interconnected semi rigid rods into arched resiliently deformable support rods extending upwardly between opposed corners of the structure. The support rods can be removed and the assembly collapsed for storage.

U.S. Pat. No. 5,277,148 (Rossignol) discloses a wearable pet enclosure for small animals which can be worn on the front or back of the animal bearer. Straps have been attached to a solid base to which a complete enclosure is fastened. The enclosure can be suspended from shoulders and waist of the bearer using straps, thus freeing the arms and hands. The enclosure has transparent and completely air permeable membranes, a solid base to form the floor of the enclosure, a recessed configuration of the base to provide distribution of the animal's weight close to the bearer. The enclosure is accessible through right and left rear access openings which have a zipper.

U.S. Pat. No. 6,899,057 (Chrisco) discloses a pop-up pet carrier. The pet carrier is collapsible and includes a base with a shiftable frame which can be moved between a collapsed position and an extended use position. The carrier has a flexible cover, an animal doorway, and optional see-through windows. The frame is formed of a flexible and resilient memory shape material which allows the frame to self erect when unrestrained. The carrier includes a top which meets with the base to form a carrier housing. Referring to column 4 at line 17, the top cover is equipped with a flexible carry handle which may be sewn or otherwise affixed to the outer surface of the cover. This permits the carrier to be easily transported, even with a pet confined within the carrier.

U.S. Pat. No. D469,929 (Licciardello) discloses a pet carrier which seems to be configured in the shape of a pup tent with a translucent meshing and a handle on the roof of the tent to allow the owner to carry the pet and the carrier. The carrier seems to have a front door substantially shaped as a parabolic curve with the door being opened and closed by what seems to be a zipper. The pet carrier seems to have a rigid base.

A third Prior Art sector includes:
Self-Erecting Tents

U.S. Pat. No. 3,960,161 (Norman) discloses a portable structure having a principal utility which is for tents or the like. The structure comprises a continuous loop of flexible coilable resilient material such as a flat spring steel stock. This support is secured to the fabric structure at a plurality of points or preferably continuously held onto the fabric through an elongated pocket. The support and fabric bound together assume a saddle-shaped configuration. The coilable frame allows the structure to be readily collapsed and is virtually self erecting.

U.S. Pat. No. 5,137,044 (Brady) discloses a collapsible tent structure which is self erecting and freestanding. The structure is supported by two flexible hoops. The tent can be easily and compactly collapsed with a simple twisting and folding motion into three concentric circular hoops, each approximately one third the size of the original hoop.

U.S. Pat. No. 5,163,461 (Ivanovich) discloses a self erecting shelter which has a top, sides and floor made of a one-piece fabric envelope with a built-in armature made from a single and continuous length of steel wire coiled into two hoops. The entire structure can be folded, twisted and bound into a flat circular package for transportation and storage. When released, the collapsed structure instantaneously springs back into a complete and fully erected shelter.

U.S. Pat. No. 5,249,592 (Springer) discloses a self erecting tent which makes use of a pair of flexible coilable resilient bands such as the use of steel bands to form the frame of the tent. One band can be folded in to nest within the other and the two nested bands can be twisted to assume a coiled stable configuration for storage transport. The tent is self erecting since disturbing the coiled configuration bands causes them to uncoil and resilience of the bands and springs connecting them causes the frame to self erect.

U.S. Pat. No. 5,343,887 (Danaher) discloses a self erecting portable fabric structure for use as a tent which has an end panel at each end. The ends have angular hoops constructed of flexible resilient strip material which can be reduced to a much smaller dimension by twisting. A sheet is stretched between the space of each hoop. A rigid force distributor is attached to each of the plurality of struts to engage the sheet within each hoop.

U.S. Pat. No. 5,601,105 (Blen) discloses a self erecting tent having three closed loop frame members which crisscross each other along their respective left and right mid points. The first closed loop frame member is threaded through the front sleeve and the rear arch sleeve of the tent body. The second closed loop frame member is threaded through the upper front arch sleeve and the roof lower sleeve of the tent body. The third closed loop frame member is threaded through the lower front arch sleeve and the rear floor sleeve. This produces a tent body having a lower front panel, an upper front panel, central panel and a rear panel. The front door is in the lower front panel; the entire structure can be folded, twisted and bound into a flat circular package for transportation and storage. When released, the collapsed structure instantaneously springs back into a completely erected tent.

U.S. Pat. No. 5,645,096 (Hazinski) discloses a nonsymmetrical loop pop up tent structure and method which is configured to have high substantially vertical walls with the floor-in area slightly larger than the walled-in area. A method of folding the tent into a flat circular shape for ease of storage and transportation is also provided using as referred to in column 4 around line 12, a rod or wire frame made from an appropriate material having spring like characteristics such as fiberglass. Also metal is alternatively used.

U.S. Pat. No. 5,676,168 (Price) discloses a fast erecting tent which uses several open-ended arcutate which are interconnected by a single connector piece. The frame as referred to in column 5 around line 19, can be coiled and quickly and easily made into a disk for convenient transportation and storage. Storing of the tent is performed by manually pulling apart the segments of shock struts and coiling the frame. To erect the tent, the frame is allowed to assume its unconstrained shape and segments in the shock struts are manually reassembled.

U.S. Pat. No. 6,109,282 (Yoon) discloses a self erecting loop structure which has a compact easily erected and easily packable portable structure. A body compressed of flexible sheetlike material is supported by a resilient single closed loop frame. A tent is created and requires no additional support or attachment to the ground to remain upright because of a low center of gravity provided by the roof portion of the structure. The roof portion has an hourglass shape and includes sidewalls descending from the roof at near vertical angles.

U.S. Pat. No. 6,672,323 (Gupta) discloses a multipurpose self erecting structure having advanced insect protection and storage characteristics where the self erecting structure uses resilient lower and upper supporting loops which provide structure with shape and support. Fabric covers the support loops and is permanently affixed to the support loops. Fabric has a lower waterproof portion and an upper insect protection portion. The support loops are made of flexible, resilient rods such as vinyl, fiberglass, or combination thereof and having a diameter selected to enable the support loops to fold into six concentric loops so the structure can be compactly stored in a rucksack. Referring to column 3 at line 54, the structure is self erecting and utilizes a springy skeletal support structure including a pair of elliptical or ovoid loops from a resilient and strong material. The current embodiment is designed to enable military soldiers to use as referred to in column 6 at line 56, a single unit having the ability to provide insect protection both in the field and in a field hospital, as well as rain protection which can double as a poncho.

In light of the Prior Art, the below-mentioned embodiment is provided to meet the needs as previously discussed.

SUMMARY OF THE DISCLOSURE

An object of the current embodiment is to provide a portable, lightweight, self-erecting pet enclosure which enables the pet owner to bring the pet into previously inaccessible environments. The lightweight structure of the pet enclosure membrane as well as the support structure itself enable the pet owners to carry with them the pet enclosure and create a contained environment which is relatively safe and secure for the animal.

Along these lines, the portable pet enclosure is constructed of a nylon material which has a webbing substantially small enough so that the animals paws and or noses and jaws do not extend through the webbing but which is large enough to enable the animal to grab onto the webbing or netting so that for example a cat can stretch its claws as it would on a scratching post. Another benefit of having a large enough spacing of the nylon material is so that the animal can have a view through the semitransparent nylon webbing and also so that the owner can have a view into the pet closure to keep close tabs on the animal.

Many times it is difficult to insert the skittish animal into the pet enclosure. The animal may fight to get out of the confined space. In such a situation, a small insert port designed to allow for quick insertion of the animal into the pet enclosure and fast closure of the port is beneficial. The current design has a small insertion port on the front face of the pet enclosure and a large extraction port on the side of the pet enclosure. The large extraction port is designed so that the pet owner can have access to the entire interior space of the pet enclosure to remove stubborn animals.

Taking an animal into an unfamiliar environment can sometimes be difficult when the animal is skittish and/or agitated for various reasons. This can make the installation and/or erection of standard pet enclosures difficult.

Therefore, in the current embodiment, the pet owner can optionally hold the animal and one arm while erecting or installing the portable self erecting pet enclosure in the other hand. The installation and erection of the pet enclosure is made possible by the use of a flat metallic spring loop material which has a memorized shape in the erected position of the pet enclosure.

One form of the metallic spring loop material is to use two concentric loops approximately the same diameter. A foundation loop and a frame loop are each inserted into support structure sleeves which are woven onto the nylon material for the desired loop configurations. Because the spring loops are self contained within the support structure sleeve, the spring when in the erected position will reach a static equilibrium.

In the erected position, the pet enclosure can be designed for a number of different configurations including a saddleback configuration, a trapezoidal prismatic configuration, a cubic configuration, and a semi-spherical configuration.

For example, the saddleback portable self erecting pet enclosure can be collapsed into a storage position by folding the two concentric loops together and coiling them into six smaller concentric rings. An elastic band is then wrapped around the coiled concentric rings and this configuration is then inserted into a carrying case.

Comfort of the animal is also important, thus a nylon ripstop shield is designed to provide for shade of the animal in high sunlight areas such as parks. Also a removable cushion has been designed to be placed within the interior of pet enclosure giving the pet something to rest on.

The portable pet enclosures can also be used when showcasing animals for adoption and/or groups of animals who have the same pet owner. Thus grouping the self erecting pet enclosures and then connecting them by a conduit enables the pet owner to create controlled socialization environments between the pet's by selectively opening and closing the conduits which connect the individual units.

The pet enclosures can be used for travel situations where the structure is put into the back of for example a minivan and secured so that the lightweight structure does not easily move while the animals are in the enclosure in the mini-van. Further the pet enclosures can be provided in smaller sizes to fit on staging tables which can be used during animal or breeding competitions and the like.

BRIEF DESCRIPTION OF THE DRAWINGS

FIG. 5 is a plan view of a tripartite assembly of portable self-erecting pet enclosures in semispherical configurations connected by multiple conduits in series;

FIG. 5a is a plan view of a 5-part assembly of portable self-erecting pet enclosures in semispherical configurations connected by multiple conduits in both parallel and series;

FIG. 9 is a cross-sectional view of a portable self-erecting pet enclosure connected to a pet door by the conduit;

FIG. 10 is an elevational view of the conduit gasket;

FIG. 11 is a detailed view of the conduit gasket connecting to the portable self-erecting pet enclosure membrane;

DETAILED DESCRIPTION OF THE PREFERRED EMBODIMENTS

Figure 1:
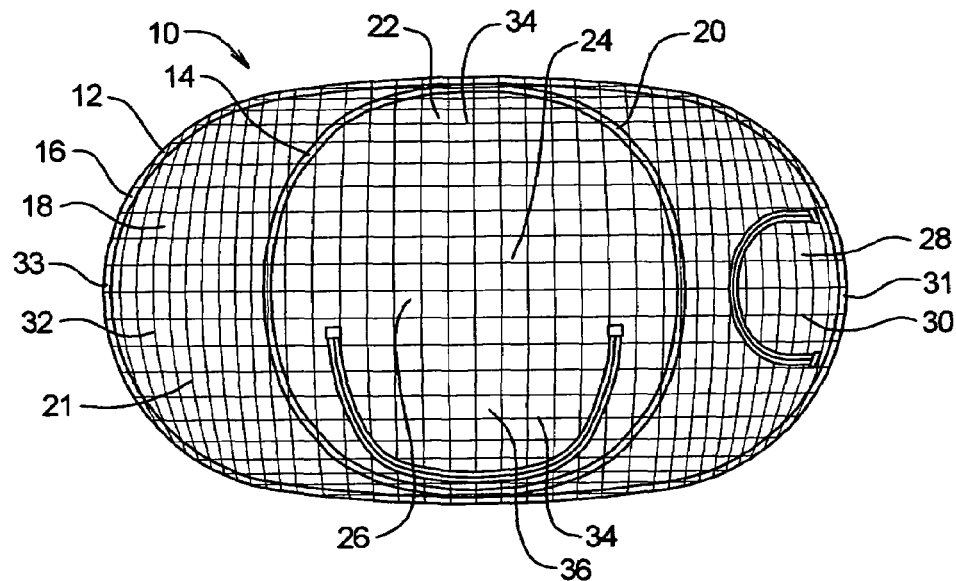
FIG. 1 is a plan view of the portable self-erecting pet enclosure.
Figure 2:
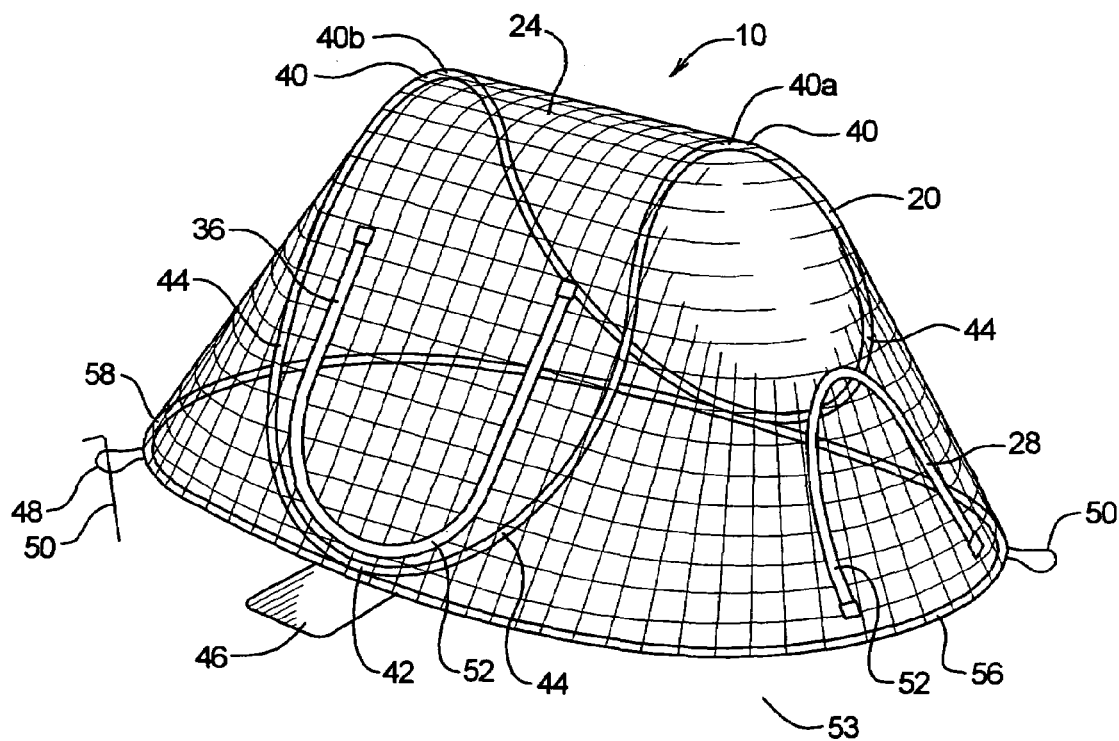
FIG. 2 is a perspective view of the portable self-erecting pet enclosure.

Now referring to FIGS. 1 and 2, the portable self-erecting pet enclosure 10 can take many forms but is currently shown as a semicylindrical volume with draping front and back wall sections, the overall volume resembling a saddle-back configuration.

Figure 3:
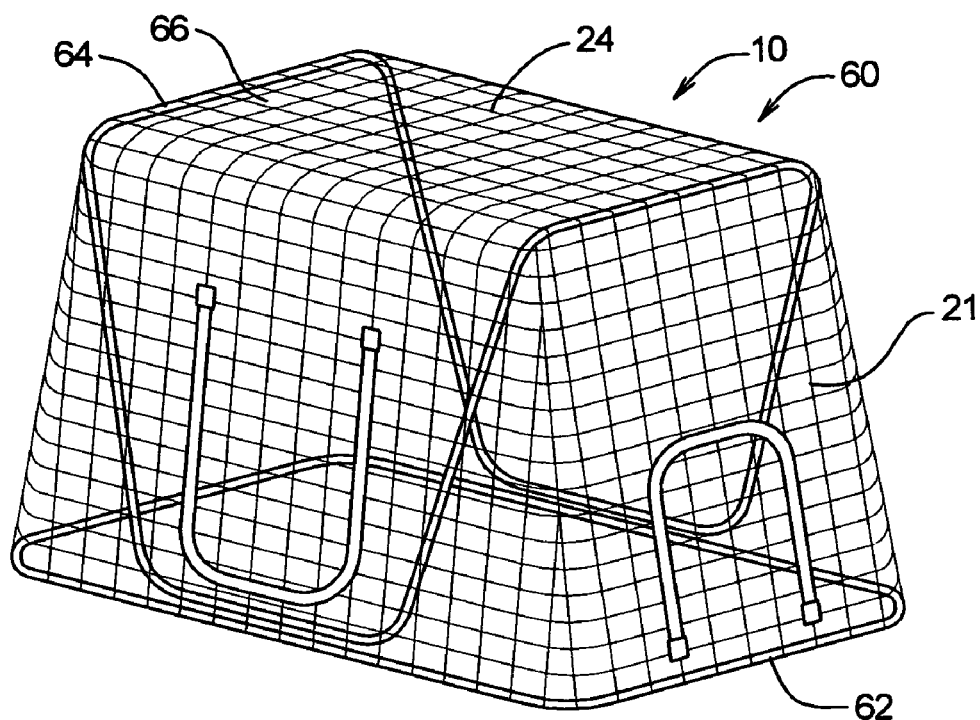
FIG. 3 is a perspective view of an alternative embodiment of the portable self-erecting pet enclosure in a trapezoidal prism configuration.
Figure 4:
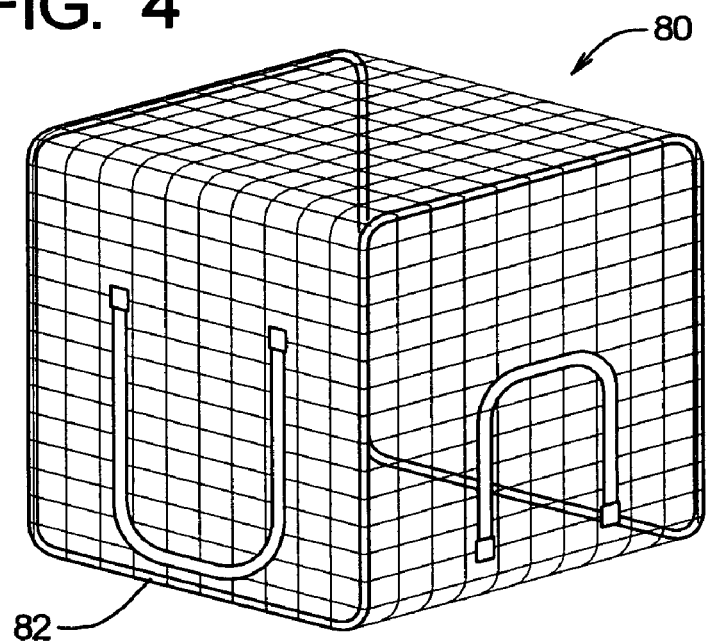
FIG. 4 is a perspective view of an alternative embodiment of the portable self-erecting pet enclosure in a cubic configuration.

To provide for a self-erecting structure which can open from a collapsed position into an erected position, a structural support system is used having a flexible frame comprised of resilient memory-shaped material which allows the frame to self-erect when unrestrained from the collapsed stored position. For the most part, minimal user intervention is required to erect the pet enclosure 10. The enclosure utilizes a foundation 12 and a frame 14. The foundation 12 is defined in the current embodiment by an oval perimeter ring 16. Even though the current embodiment uses an oval perimeter foundational shape, other shapes and configurations can and may be utilized such as a rectangular foundational shape 62 as seen in FIG. 3, as well as a square perimeter foundational shape 82 as seen in FIG. 4, and a circular foundational shape 102 as seen in FIG. 5.

While the foundational ring or oval perimeter ring 16 generally defines the outer limits of the portable self-erecting pet enclosure or in other words the footprint of the structure, the frame 14 defines the volumetric interior space of the pet enclosure 10.

The frame 14 in the current embodiment is constructed of a three-dimensional sinusoidal support frame or system 20. Because of the flexible and elastic nature of the support frame 20, many different volumetric shapes can be utilized including a saddle-like configuration as seen in FIG. 2, which is essentially a semicylindrical configuration with draped front and rear portions. Other configurations such as the trapezoidal prism shape 60 as seen in FIG. 3, the cubic shape 80 as seen in FIG. 4, and the semi-spherical shape 100 as seen in FIG. 5 are utilized and can easily be configured using the flexible frame 14 with the resilient memory-shaped material as discussed below.

In the current embodiment the resilient memory-shaped material or frame 14 is sewn into the membrane 21, thus being confined to a preconfigured erected shape. Other methods of attachment including fixing the frame by loops connected to the membrane 21 or other such standard industry fabrication techniques for connecting fabric to rigid structure fabrication techniques can be utilized.

In the current embodiment as seen in FIGS. 1 and 2, the support frame 20 has a peak 40 and a frame trough 42. The frame peak 40 supports the roof membrane 24 and the roof membrane spans from the forward peak 40a to the rearward peak 40b. Discussing the three-dimensional configuration of the frame 14, the sinusoidal frame 20 transitions from the frame trough 42 to the frame peak 40 along a curved frame support member or frame leg 44, the frame trough 42 acts as the footing of the support frame 20 and the trough 42 runs generally in the longitudinal direction, meaning from the forward portion 31 of the pet enclosure 10 to the rearward portion 33. The curvilinear frame support member 44 runs vertically from the base of the support frame 20 to the roof area and transitions into the frame peak 40. The peak generally runs perpendicular to the frame trough 42 and in the transverse or side to side direction. As previously mentioned, the roof membrane 24 is supported by the frame peak 40 and the membrane sidewalls 34 are supported by the roof membrane as well as the curvilinear frame support members 44 which transfer the dead loads of the membrane down into the frame trough 42. Additionally, the forward portion 31 and the rearward portions 33 are closed by both the front membrane 30 and a rear membrane 32. The front and rear membranes are supported by the respective forward and rearward peaks and extend to the perimeter ring front portion 56 and the perimeter ring rear portion 58. Thus the membrane connects to the entire perimeter ring creating a fully enclosed space.

Figure 2A:
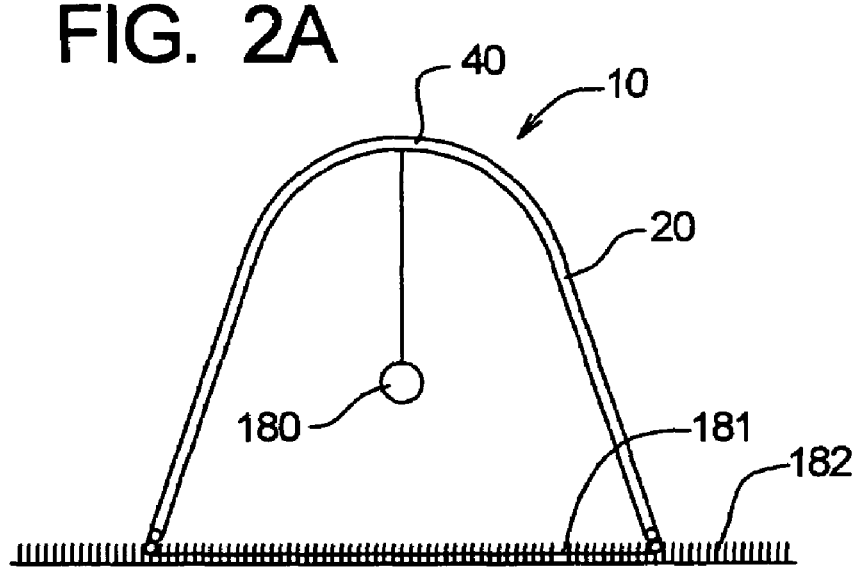
FIG. 2a is a cross-sectional view of the portable self-erecting pet enclosure.

Referring to FIG. 2a, the support structure 20 configured in the parabolic arch form has attached to it a hanging toy 180 which is connected to the apex or top cord or frame peak 40 of the support structure. Animals within the portable pet enclosure 10 such as cats or other small animals which enjoy playing with such hanging toys 180 would be able to knock at the toy to create some form of entertainment.

The foundation 12 as seen in FIG. 2, contains a floor membrane 18 which further encloses the animals into the pet enclosure 10. The floor membrane 18 may be constructed of the same membrane material that comprises the roof and walls of the pet enclosure 10. Referring back to FIG. 2a, the floor membrane 181 is provided in a webbing format and is positioned in a grass environment 182. The animals can have contact with the grass which projects through the webbing floor membrane 181, allowing the animals to chew on the grass 182 and/or feel as though they are in an outdoor unrestricted environment.

Figure 2B:
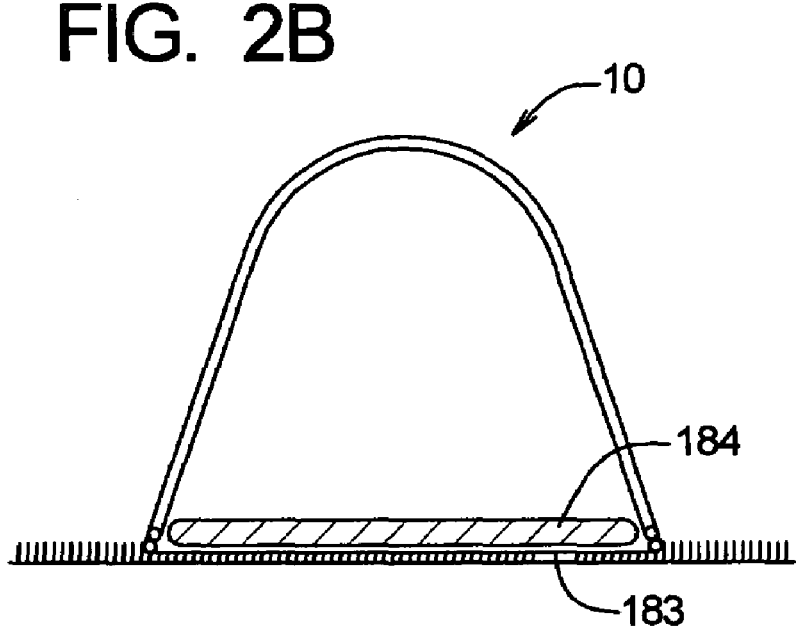
FIG. 2b is a cross-sectional view of the portable self-erecting pet enclosure with a removable cushion.

Alternatively, referring to FIG. 2b, the floor membrane may be a solid nylon fabric construction 183 which provides for weather resistance and/or protection from the animals if the pet enclosure 10 is placed in an interior environment such as on carpet. The interior environment may need protection from animals who might not be trained to use a cat box or the like. Still referring to FIG. 2b, a removable cushion 184 is provided which is constructed of an outer fabric made of nylon and has an inner fill providing a cushioning effect.

To access the interior portions of the pet enclosure 10 in the current embodiment, an insertion port 28 is provided which is opened and closed through the use of a zipper 52. The current configuration has the insertion port 28 in the form of an inverted U-shape and is substantially large enough to allow a small dog or cat to enter through the doorway.

Many times, it is difficult to extract the animal from pet enclosures or pet carriers because the animal for various reasons may not wish to come out of the enclosure when the owner needs the animal to do so. Therefore, to facilitate immediate removal of the pet, a large owner-accessible pet extraction port or door 36 is provided. In one form the door encompasses a majority of one of the sidewalls 34 and is configured in the shape of an upright U. The pet extraction port also utilizes a closure zipper similar to the previously mentioned pet insertion port 28.

In keeping with the need for a flexible frame comprised of a resilient memory-shaped material which can allow the support system or support frame 14 to self-erect when unrestrained from a stored or collapsed position, a number of different materials for the support structure can be utilized. These include as previously mentioned, a lightweight metallic flat rod or thin gauged material such as of a flat spring steel construction or other structural systems which have high elasticity and a corresponding spring coefficient to provide the required self-erecting uncoiling properties and support functions. Other structural support materials include fiberglass, heavy plastic, durable lightweight alloys such as aluminum, as well as composite materials such as graphite and the like. For example, a fiberglass rod having a cross-sectional diameter of around ¼ of an inch can be used as a support structure and provide similar elasticity and spring characteristics required to uncoil and self erect. Further, the lightweight characteristics of fiberglass make the use of this material beneficial with regard to transportation purposes.

Figure 2C:
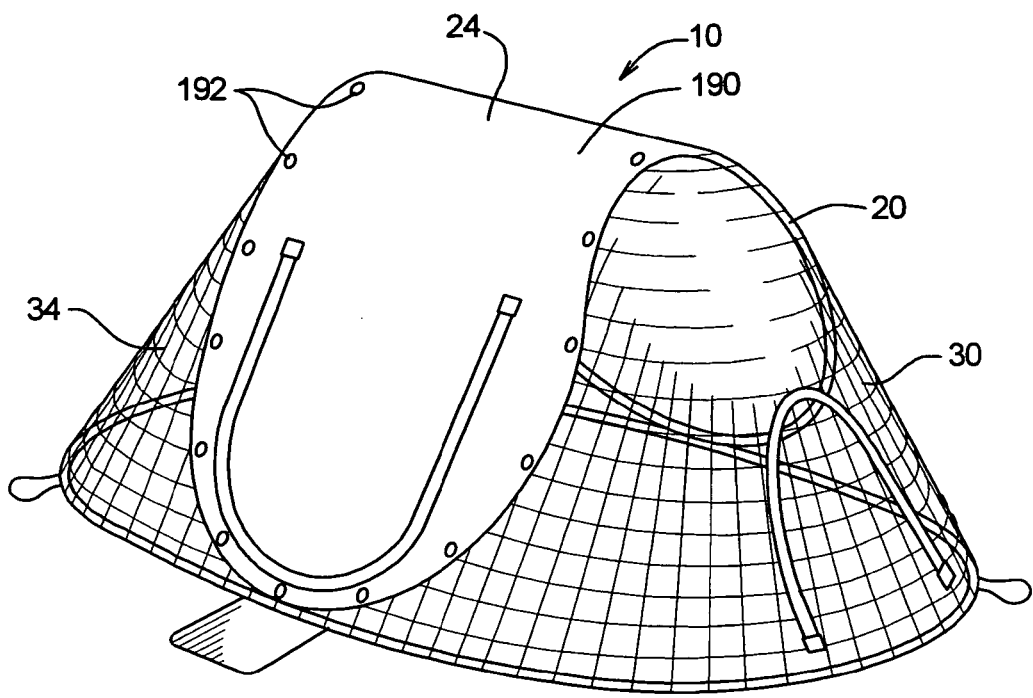
FIG. 2c is a perspective view of the portable self-erecting pet enclosure with a nylon rip stop shading device.
Figure 2D:
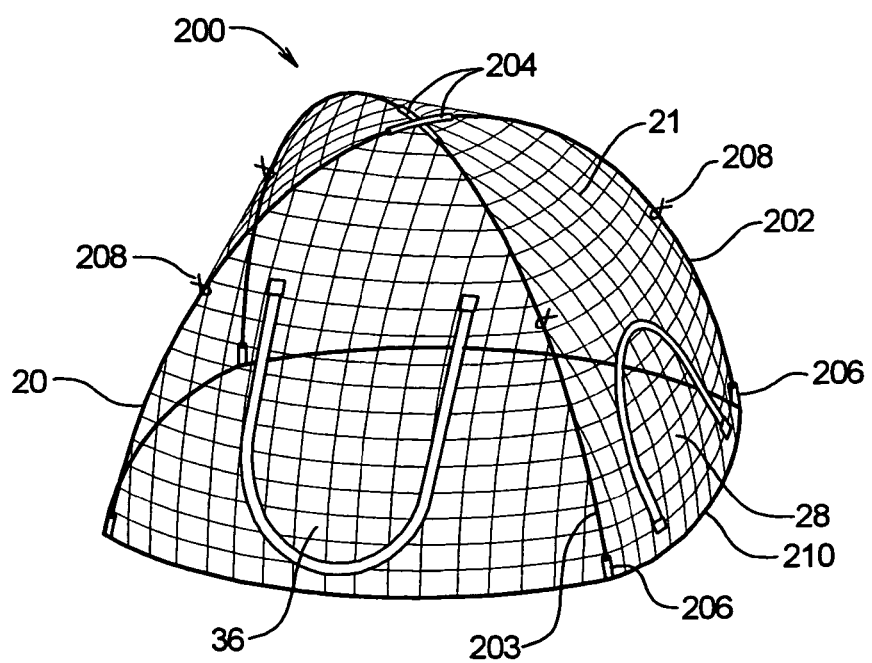
FIG. 2d is a perspective view of a lightweight dome simple erecting portable pet enclosure.

Referring to FIG. 2d, an alternative embodiment to the self-erecting structural system is a lightweight simple erecting pet enclosure 200. This enclosure utilizes two shock-cord fiberglass poles of standard dome tent construction. In the alternative embodiment, a first shock cord 202 is provided and a second shock cord 203 is provided. The shock cords are threaded through the two top cord support sleeves 204 which are connected to the top portion of the membrane at the apex of the dome. To erect the dome, the user will install one end of the, for example, first shock cord fiberglass pole 202 into a bottom cord anchor sleeve 206. The foundation 210 has four bottom cord anchor sleeves 206 positioned equidistantly around the perimeter of the foundation. Continuing with the discussion of the erecting of the lightweight dome 200, the user will then bend the first shock cord pole 202 into a parabolic shape and insert it into the opposing bottom cord anchor sleeve. The same installation process will occur for the second shock cord 203. Afterwards the lightweight dome 200 is erected and ready for anchoring to the desired surface, for transportation to another location, or insertion of the domesticated animal through one of the 2 ports, either the insertion port 20, or the extraction port 36. The ports for insertion and extraction serve the same purposes as previously discussed in the self-erecting pet enclosure 10 as seen in FIGS. 1 and 2.

Allowing the animal to feel as though it were experiencing the outdoors and still be safely contained within the pet enclosure 10, will keep the animal in a relatively calm state. The membrane 21 of the pet enclosure has been designed with a relatively large fiber weave spacing to allow the animal to have visual contact with the outside space as well as to allow the pet owner to have visual contact to the interior portions of the pet enclosure and to allow the free flow of air through the membrane itself.

As previously mentioned, in the preferred embodiment, the membrane 21 is constructed of a nylon webbing or netting which has a fiber weave substantially tight enough to prevent one of the contained animals paws or noses from extending through the netting. This tight weave enables the owner to keep the animal's paws from becoming tangled in the pet enclosure membrane 21.

Additionally, during outdoor usage, the pet may wish to be placed in a cool shady place. This tighter weave of the membrane 21 provides a certain level of shading but also provides a transparency so that the animal as previously mentioned can look outside of the enclosure, and the pet owner can look inside the enclosure to determine how the animal is adapting to the new environment.

Referring to FIG. 2c, the portable pet enclosure 10 is provided in the alternative embodiment with a nylon rip stop shade element 190 which in the current embodiment is shown as a semipermanent option. The shade 190 can be attached to the walls and roof of the membrane 21 by using securing elements 192 such as buttons and/or a woven-in zipper. Although the alternative embodiment only shows a shade cover which encompasses a portion of the outer surface of the pet enclosure, an additional covering which encompasses the roof membrane 24 as well as the front wall 30 and rear wall 32 can easily be provided. Additionally, the outer membrane 21 can be constructed of opaque nylon rip stop shade material for a permanent enclosed structure with optional windows.

Discussing the strength of the membrane, many times the animals may be domesticated but may still have their claws attached and will tend to naturally grab and stretch out these claws on tactile surfaces. The nylon fiber weave allows the animals to grab onto the webbing with their claws so they can stretch and pull the claws as somewhat of a therapeutic exercise. In order to resist the tearing of the nylon fibers, the webbing has been designed with a cross-sectional area large enough to resist the shearing forces and tensioning forces caused by the claws of the contained animal. For example, the webbing may have a weave of approximately 3/16 to ¼ of an inch spacing and the fibers themselves might have a cross-sectional diameter of approximately ⅛ of an inch to resist the immediate tearing of fibers by the animal. By using the nylon webbing, the overall enclosure can remain relatively strong but still lightweight.

Another plus to having a lightweight self-erecting structure is that the pet enclosure 10 can be collapsed and placed into a small container for transportation to and from various locations. Thus the current embodiment is designed so the pet enclosure 10 can be collapsed into a series of small concentric coils or loops which can be held in place by an elastic band or other restraining device.

Figure 6:
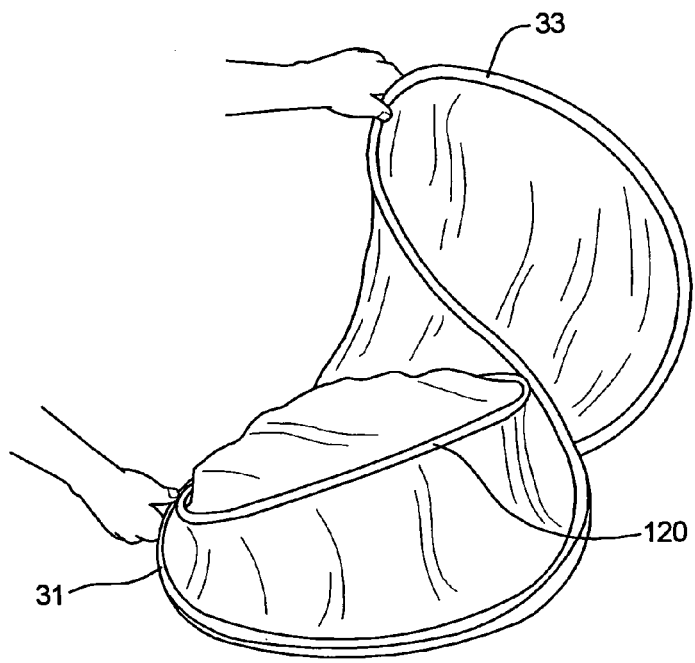
FIG. 6 is a perspective view of the portable self-erecting pet enclosure in a coiling position.
Figure 7:
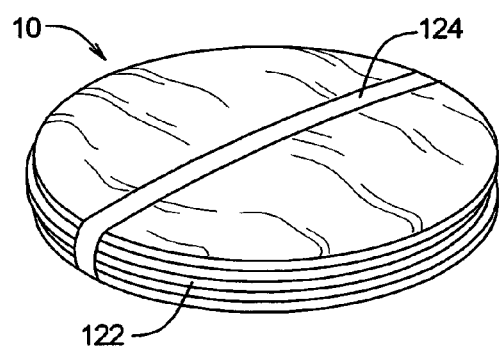
FIG. 7 is a perspective view of the portable self-erecting pet enclosure configured into 6 concentric rings.
Figure 8:
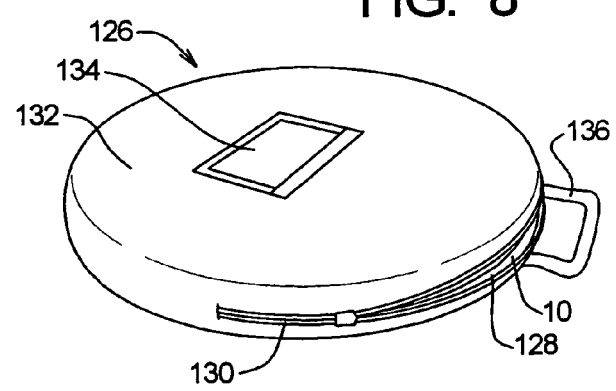
FIG. 8 is a perspective view of the portable self-erecting pet enclosure contained within a carrying case.

Referring now to FIGS. 2, 6, 7, and 8, a discussion of the process for collapsing and/or erecting the portable self-erecting pet enclosure 10 will now be provided. Specifically referring to FIG. 2, after the animal has been removed through the extraction port 36, the user will generally need to use two hands to collapse the enclosure. One process for doing so will be to grab the front peak 40a and the front portion perimeter ring 56 in one hand and the rear peak 40b and the perimeter ring rear portion 58 in the other hand. Referring to FIG. 6, the rearward portion 33 and the forward portion 31 are pushed together, creating a series of concentric loops 120 which can then be folded down upon one another, creating a series of stacked rings 122 as seen in FIG. 7. In the correct embodiment, 6 rings are formed from this procedure. An elastic band is then wrapped around the concentric rings to hold the pet enclosure 10 in its' collapsed position. A carrying case 126, as seen in FIG. 8, is configured in a substantially flat sphere having an opening 128 through which the portable pet enclosure 10 can be inserted. In one form, the carrying case 126 has a closure zipper 130 to keep the stored pet enclosure 10 from accidentally falling out. On the front face 132 of the carrying case 126 is positioned a storage pocket 134 which can hold reading materials, advertising materials and the like. To facilitate carrying of the carrying case 126, two carrying case handles 136 are provided.

Once the pet enclosure 10 is stored, the entire apparatus is ready for transportation to the new location. After the user reaches the new location, the owner may have to hold the small animal in one arm while erecting the pet enclosure 10 using just one hand. With the self-erecting capabilities of the chosen structure, this is simply performed. Using one hand, the owner can unzip the carrying case 126 and extract the coiled pet enclosure 10. By removing the elastic band 124 and holding onto one of the concentric rings 122, the owner can easily uncoil the pet enclosure 10 by lightly shaking the apparatus until it is returned to its' memorized shape. The owner can then insert the small animal through the insertion port 28 as previously discussed in FIG. 2 and then install anchors 50 through a series of stake anchor loops 48 positioned along the perimeter of the foundation 12, or fill attached sandbag anchors 46 with rocks or sand to keep the lightweight portable pet enclosure 10 from blowing away in high winds.

While the current embodiment has been discussed in a single unitary application, users may find it beneficial to attach one or more of the portable units to one another creating a series of pod-like structures. The enclosures can be connected by conduits. Additionally, users may wish to direct their pets from the inside of the house through a pet door or dog door connected to the back door of the house and into the pet enclosure 10. A conduit to fit both a pet door and an insertion port of the pet enclosure 10 is provided.

Therefore referring to FIGS. 5, 5a, 9, 10, 11, and 12, we will now discuss the grouping and connecting of the series of pet enclosures 10 by using a conduit which has a collapsible closure gasket using the same memory-shaped material as the frame of the portable pet enclosure, such as the flat spring metal.

First referring to FIG. 5, a series of semispherical pet enclosures 100 are connected by a number of cylindrical conduits 104, which are configured to seal onto the small insertion ports 28. In this embodiment, the cylindrical conduits 104 are connected to the membrane 21 by a series of buttons or snaps 106.

As mentioned previously, the portable pet enclosures 10 can also be placed in for example a user's backyard 160. The pet enclosures can be positioned in the general vicinity of say for example the back door 116 of the house and in close proximity to the back door having a pet door 118.

Referring to FIG. 9, a portable self-erecting pet enclosure 10 is shown positioned and connected to the pet door 118 within a backyard environment 160. The conduit 104 as previously discussed, is constructed of a conduit membrane 108 which is substantially a cylindrical configuration. The conduit membrane 108 can be optionally reinforced with structural support members. In this particular embodiment, the conduit 104 has rigid strut members 107 spaced equidistantly around the perimeter of the cylindrical conduit and woven into the conduit membrane 108. The conduit membrane itself is constructed of the same material as the pet enclosure membrane 21 as previously discussed. The floor of the conduit 105 is left unreinforced thus being allowed to sag towards the floor 146. This contact with the floor allows the animal sure footing when it walks from the interior space of the house into the pet enclosure interior area 148.

Referring to FIG. 10, to ensure that the transition between the interior house space and the pet enclosure 10 is reasonably secure and so that the animals do not escape, the conduit gasket 114 is sized larger than the port width 150 and the port height 152. Because the conduit gasket 114 is collapsible to a certain extent and can spring back to its memorized shape, the user can temporarily collapse or configure the conduit gasket into a narrower shape so that it can be inserted through the insertion port 28 and sprung back to its' memorized shape. The user can then connect the gasket to the reinforced semi-rigid webbing which surrounds the insertion port opening 28.

Referring to FIG. 11, the conduit gasket is shown in cross-section with the gasket frame 154 as a flat metal frame which has been configured to substantially the same shape as the insertion port and is connected to the outside face of the semi-rigid enclosing material. This opening border material in one form is a semi-rigid nylon. A male snap 156 fits into a female snap 158 connected to the insertion port semi-rigid webbing 140 which defines the port opening.

Figure 12:
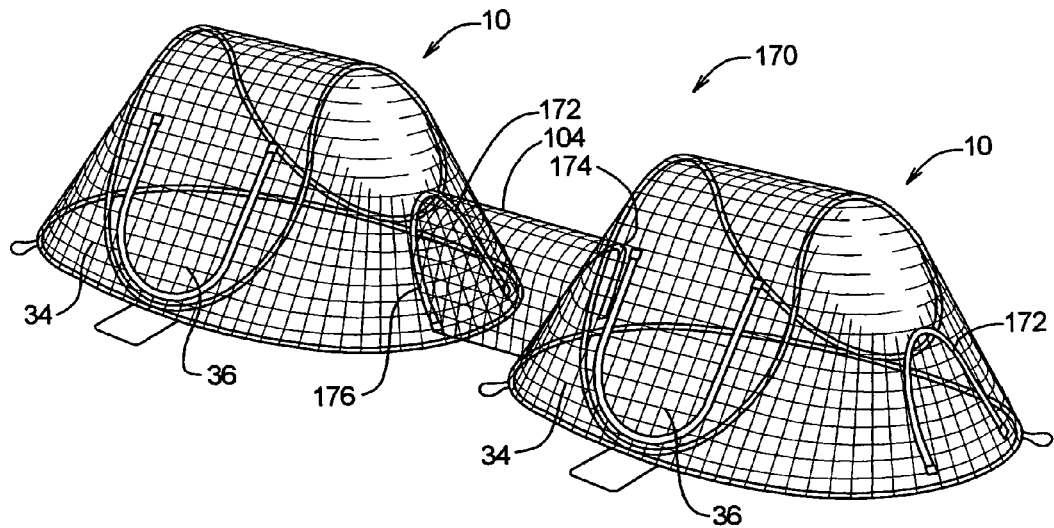
FIG. 12 is a perspective view of the portable self-erecting pet enclosure in saddleback configuration connected by the conduit in series.

For various reasons the pet enclosures may be placed in series or parallel or interconnected in various grouping formats to allow the pets to commingle and intercommunicate with one another while they are enclosed. Referring to FIG. 12, a dual unit pet enclosure assembly is placed in series 170 shown where the saddle-back configured pet enclosures 10 are connected by a cylindrical conduit 104.

The saddle-back pet enclosures 10 have been modified to include a forward insertion port 172 and a rearward insertion port 174. For ease of access, the extraction port 36 still remains positioned on the side walls 34 of the individual pet enclosures. The conduit 104 is installed between the two pet enclosures, and connected using the button snaps to the forward and rearward insertion ports or in other words intercommunication ports 176. Referring now to FIG. 5a, a 5-unit pet enclosure assembly in series and parallel 180 is shown to help describe the modularity of the individual pet enclosures. In this particular embodiment, the semispherical pet enclosure 100 is utilized. Here the individual pet enclosure units have 3 small insertion ports 28 and one large extraction port 36 for each unit. This enables the pet enclosures to intercommunicate with one another through the connectable conduits 104 between each of the smaller enclosure intercommunication ports 176. Such a grouping is useful when showcasing animals at say for example a Humane Society adoption proceeding which could take place in a local park or other public space. The grouping is also useful when introducing multiple new pets into a single household environment.

Because the conduits 104 utilize pull strings 109 which enable the pet owner to control pet access between the enclosures, the pet owner can selectively allow commingling between various animals. In this particular configuration, 5 animals have been placed in the 5-unit pet enclosure assembly and the pet owner has restricted access to two of the animals, allowing for intercommunication between the bottom 3 and the top 2 semispherical pet enclosures 100. As the animals become used one another, the owner can then selectively intermingle the animals to allow for domestication of pets and/or socialization of the animals.

Figure 13:
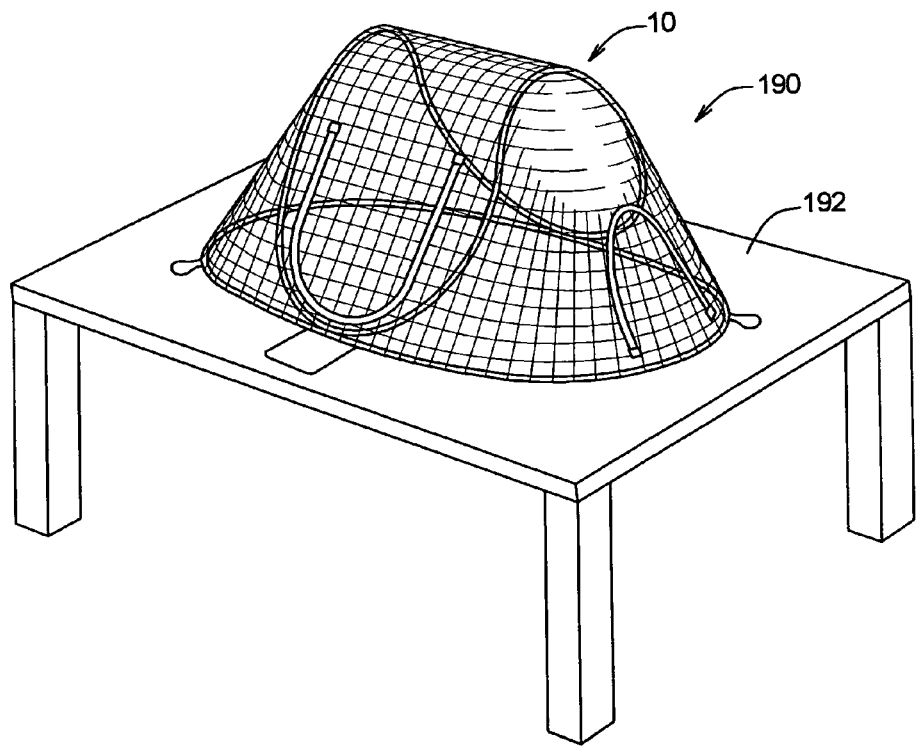
FIG. 13 is a portable self-erecting pet enclosure on a staging table for use in a pet competition.

As was previously mentioned, the portable pet enclosure 10 can be used for various pet activities including animal competitions and the like such as canine competitions or feline competitions. Referring to FIG. 13, during these activities, the owner and the pet will usually prep backstage and likely have need of a preparation table 192 within the staging area 190. Because of limited spacing available, the pet enclosure 10 is designed as an alternative embodiment as a smaller scaled down size for these activities.

Figure 14:
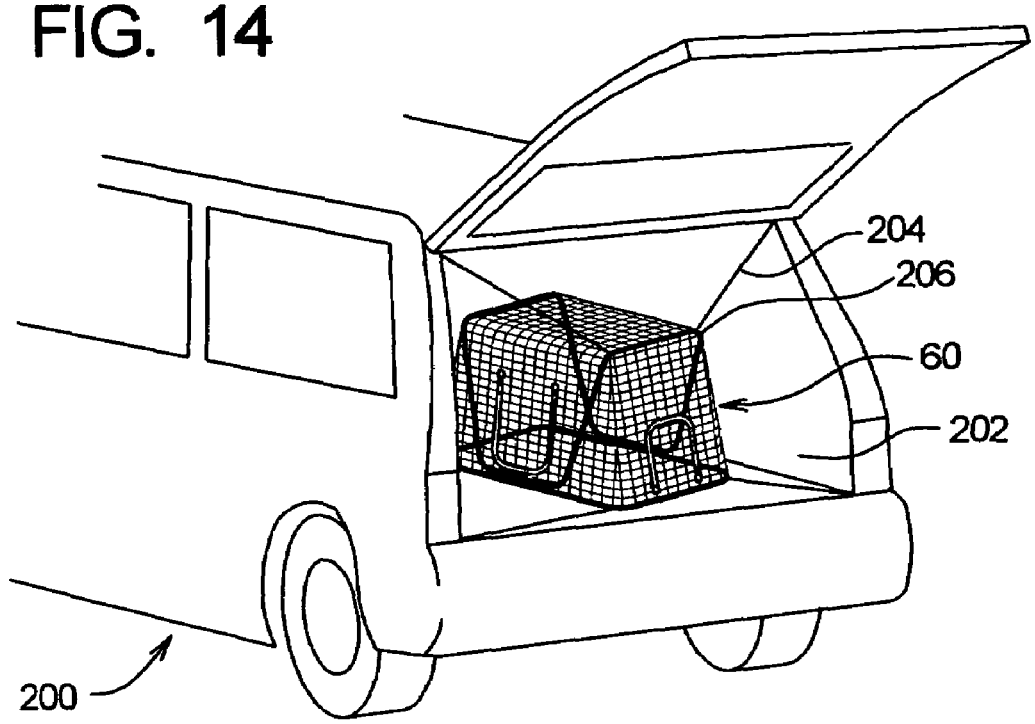
FIG. 14 is a perspective view of the portable self-erecting pet enclosure placed in an automotive vehicle.

Similarly, the portable pet enclosure can be used in travel situations. The enclosure can be fitted into the rear portion of a vehicle 200 as seen in FIG. 14. In this particular embodiment, the pet enclosure is of the trapezoidal prism design 60 as previously discussed in FIG. 3, and to secure the lightweight structure from moving in the rear portion 202 of the vehicle 200, a series of hooks and straps 204 are employed to be anchored from the corners 206 of the pet enclosure 60. Because of the relative ease of erecting and collapsing the pet enclosure, this particular pet enclosure design makes for an easy to use pet safety transportation containment device.

Therefore we claim:

1. In combination:
   a. a carrying case arranged to hold a domesticated animal enclosure; said carrying case constructed of nylon material and configured with two handles for a user to hold said carrying case;
   b. a compressed state of said domesticated animal enclosure which is arranged into said carrying case for transportation to a location for use;
   c. a support system arranged within said domesticated animal enclosure comprised of an elastic memory material having a spring coefficient to provide for self erecting from said compressed state;
   d. a semi transparent membrane supported by said support system and comprising a plurality of woven fibers having a weave spacing about at least 3/16 of an inch or greater;
   e. a first door arranged within said semi transparent membrane and configured to open and close;
   f. a second door arranged within said semi transparent membrane and configured to open and close;
   g. an erected state of said domesticated animal enclosure which is removed out of said carrying case at said location for use and erected by said support system by utilizing said elastic memory material to provide for self erecting from said compressed state into said erected state;
   h. wherein a domesticated animal can be inserted into said erected domesticated animal enclosure through said first door within said semi transparent membrane and said domesticated animal extracted out of said domesticated animal enclosure through said second door within said semi transparent membrane.

2. The combination according to claim 1 wherein said membrane section further comprises: said fibers comprising a diameter of about at least 1/8 of an inch.

3. The combination according to claim 1 further comprising a sleeve system used to maintain said elastic memory material in a pre defined erected arrangement.

4. The combination according to claim 3 further comprising said sleeve system including a perimeter foundation sleeve arrangement and a frame sleeve arrangement.

5. The combination according to claim 4 wherein said semi transparent membrane further comprises a flooring portion and a roof portion, said flooring portion delimited by said perimeter foundation sleeve arrangement and said roof portion delimited by said frame sleeve arrangement.

6. The combination according to claim 5 wherein said perimeter foundation sleeve arrangement is configured to retain said elastic memory material in a substantially oval position, said frame sleeve arrangement configured to retain said elastic memory material in a substantially saddle-back configuration.

7. The combination according to claim 5 wherein said perimeter foundation sleeve arrangement is configured to retain said elastic memory material in a substantially rectangular configuration, said frame sleeve arrangement configured to retain said elastic memory material in a substantially inverted trapezoidal configuration.

8. The combination according to claim 5 wherein said perimeter foundation sleeve arrangement is configured to retain said elastic memory material in a substantially circular configuration, said frame sleeve arrangement configured to retain said elastic memory material in a substantially dome configuration.

9. The combination according to claim 3 wherein said sleeve system includes a cubic sleeve arrangement configured to retain said elastic memory material in a substantially cubic configuration.

10. The combination according to claim 3 wherein said elastic memory material is comprised of at least one of the following materials:
   a. a flat metallic material having high elastic bending capabilities,
   b. a fiberglass material having high elastic bending capabilities,
   c. an alloy material having high elastic bending capabilities,
   d. a plastic material having high elastic bending capabilities.

11. The combination according to claim 3 wherein said first door is configured to insert said domesticated animal, and said second door is configured to the approximate size of a human pet owner.

12. The combination according to claim 1 wherein said combination further comprises: an anchor system configured to maintain said domesticated animal enclosure at said location for use.

* * * * *